United States Patent [19]

Smith et al.

[11] Patent Number: 5,143,496
[45] Date of Patent: Sep. 1, 1992

[54] LATCHING SYSTEM FOR TRANSFER TRUCK AND TRAILER SET

[75] Inventors: Fred P. Smith; Fred T. Smith, both of Alpine, Utah

[73] Assignee: Superior Trailer Works, Inc., Fontana, Calif.

[21] Appl. No.: 661,050

[22] Filed: Feb. 22, 1991

[51] Int. Cl.⁵ .................................................. B62D 27/06
[52] U.S. Cl. .................................... 410/68; 296/35.3; 296/56; 298/8 T; 298/23 MD; 414/340; 414/472; 410/77
[58] Field of Search .................. 220/1.5; 414/341, 343, 414/345, 346, 350, 472, 473, 491, 498; 298/8 T, 23 M, 23 MD, 235; 410/52, 55, 68, 77, 84; 296/56, 35.5

[56] References Cited

U.S. PATENT DOCUMENTS

| | | | |
|---|---|---|---|
| 1,915,883 | 6/1933 | Fager | 414/341 |
| 2,983,548 | 5/1961 | Harbers et al. | 298/23 M |
| 3,721,469 | 3/1973 | Senesac et al. | 298/23 MD |
| 3,784,054 | 1/1974 | Mautz | 410/77 X |
| 3,830,542 | 8/1974 | LaBlanche | 296/56 |
| 3,860,288 | 1/1975 | Martin et al. | 298/23 MD |
| 3,938,678 | 2/1976 | Kern | 414/498 X |
| 3,966,075 | 6/1976 | Schultz | 410/77 X |
| 4,109,963 | 8/1978 | Sieving et al. | 298/23 M |
| 4,141,581 | 2/1979 | Tobin | 414/498 X |
| 4,307,541 | 12/1981 | Farmer et al. | 296/56 X |

FOREIGN PATENT DOCUMENTS

| | | | |
|---|---|---|---|
| 2057766 | 6/1970 | Fed. Rep. of Germany | 298/23 MD |
| 60-183235 | 9/1985 | Japan | 298/23 MD |
| 161500 | 11/1957 | Sweden | 298/38 |
| 381997 | 11/1964 | Switzerland | 298/23 M |
| 1533909 | 1/1990 | U.S.S.R. | 298/235 |

Primary Examiner—David A. Bucci
Assistant Examiner—Robert S. Katz
Attorney, Agent, or Firm—Workman, Nydegger & Jensen

[57] ABSTRACT

In a transfer set, a retention hook rigidly secured for rotation with the tailgate of the truck body for rotation therewith. Entry of the trailer body into the truck body automatically triggers pneumatic elements to lower the truck tailgate causing the retention hook attached thereto to capture a trailer body retention pin secured to the outside of the trailer body. A solenoid operated directional control valve prevents the inadvertent release of the trailer body when the truck body is lifted away from the truck frame to empty contents therefrom. A single pneumatic actuator releases the truck tailgate and, when the trailer body is retained in the truck body, also the trailer tailgate.

16 Claims, 12 Drawing Sheets

LATCHING SYSTEM FOR TRANSFER TRUCK AND TRAILER SET

BACKGROUND

1. Field of the Invention

This invention pertains to transfer truck and trailer sets and more particularly to a comprehensive system for securing the tailgates of the truck and trailer bodies on a selective basis and for retaining the trailer body in the truck body for tilting therewith to empty contents from the trailer body.

2. Background Art

The development of transfer truck and trailer sets has improved dramatically the capacity to transport and discharge the large volume of materials commonly associated with activities such as excavation, civil construction, mining, and demolition. In such a transfer set, the transfer truck, which has a body capable of tilting on the truck frame in the manner of a dump truck, is used in addition to tow a trailer. The trailer is provided with a body capable of being separated from the trailer frame then being entered into the truck body for tiling therewith.

By the use of this combination of equipment, the volume of material that can be transported and handled by a single truck operator attendant to activities such as those named above is substantially enhanced. The number of trips required to transport materials can be reduced, saving time and resulting in a corresponding reduction in the number of motorized vehicles required for any given project.

Nevertheless, impediments remain to fully realizing the potential benefits of a transfer truck and trailer set. In addition, such sets continue to exhibit a need to adequately preserve the safety of operators.

One such area of as yet unsatisfactory development relative to transfer truck and trailer sets relates to the manner in which the trailer body when received into the truck body is secured therein for tilting therewith. Previously a bar was fixed across the width of the truck above and at the front of the truck body. The bar was capable of being engaged by spring-loaded hooks secured to the front upper end of the trailer body as it was received fully into the truck body. Once the truck body with the trailer body secured therein had been tilted to empty contents from the trailer body, it was necessary in using such a securement system for the operator of the transfer set to climb to the top of the truck body and pivot the bar out of engagement with the hooks. This permitted the trailer body thereafter to be removed from the truck body to the trailer frame.

In the process described, the quality of trailer body securement achieved was relatively acceptable. The weight of the trailer body and its contents remained stable in the truck body during movement and tilting, and the wheels on the bottom of the trailer body infrequently came off of the rails installed in the floor of the truck body to support the trailer body.

Nevertheless, because the approach required operator access to latching mechanisms at the top of the truck body, the release of such mechanisms proved to be time consuming and inconvenient. Typically, the control of mechanism for withdrawing the trailer body from the truck body are located on the outside of the truck body toward the rear thereof at a point accessible by an operator from the ground. Accordingly, after having released the bar retaining the trailer body in the truck body, the operator was required to climb down from the top of the truck body and move on the ground to the rear of the truck body for the purpose of operating the control mechanisms by which to return the trailer body to the trailer frame.

If the transfer truck could not be parked on a very level surface during this operation, serious dangers were presented also. Once released from the truck body, the trailer body could begin to slide rearwardly without any control whatsoever out of the truck body. The longer such sliding was permitted, the more severe would be the consequences. Knowing this, operators tended to rush from the top of the transfer truck to the position at which control mechanisms for movement of the transfer trailer body could be accorded. Such haste also produced its own dangers.

Accordingly, an alternative approach to securing a transfer trailer body in a transfer truck body was undertaken. To eliminate the need for the operator of the set to climb to the top of the truck body, a cooperating latching mechanism for the trailer body was developed and placed at the bottom rear of each of the bodies of the truck and trailer. Spring-loaded hooks were secured at a low position on both sides of the truck body so as to capture retention pins on the outside and at the rear of the trailer body. A torsion bar to passing under the opening to the truck body permitted an operator at one side of the truck to release both hooks when it was desired to transfer the trailer body out of the truck body. While more convenient than the method described earlier, this approach presented drawbacks in other areas.

First, because the site of securement of the trailer body to the truck body in such an approach was at a lower rear location thereon, the trailer body and its contents were observed to have a tendency to pivot about the attachment site. This permitted the front end of the trailer body to rise inside the truck body and derail the wheels on the bottom of the trailer body from the rails upon which those wheels are designed to ride.

Securement of the trailer body at a low position in the rear of the trailer body afforded inadequate restraint on vertical movement of the trailer body. Thus, it was relatively frequent that after routine job-site jostling, a derailed trailer body could not be removed from its truck body. As a solution, various systems of interlocking horns and apertures on the outside of the trailer body and the inside of the truck body were devised, but these complicated the design and increased the cost of manufacturing the set.

Spring-loaded hooks at the bottom rear of the truck body are also dangerous to the operator the transfer set. The ready accessibility of the release mechanism utilized with this type of latching system led to its inadvertent activation on a regular basis. When this would occur, disengagement of the trailer body from the truck body was the result, with substantial corresponding injury and property damage. This risk was most severe when the truck body with the trailer body secured therein was in a tilted position.

In response, such latching systems were enhanced by incorporating a variety of safety pins thereinto which were designed to prevent thoughtless activation of the detachment mechanism. Nevertheless, the objective of such pins could also be defeated by thoughtlessness. Each required conscious operator action to effect installation for the time that the trailer body was to be retained in the truck body. Accordingly, normal forgetfulness and ingenious corner-cutting on the part of operators continued to preserve the opportunity for inadvertent trailer body detachment.

A closely related aspect of transfer trailer truck set operation which has yet received serious attention relates to the latching and unlatching of the tailgates associated with each of the truck and trailer bodies. In order to avoid exposing the operator to the dangers presented when the truck tailgate was first released, systems were devised by which to permit the operator to release the truck tailgate from inside the cab. Such systems were pneumatically or electro-mechanically affected. Nevertheless, little attention has been paid to the problem of keeping the tailgate on the trailer body securely latched until such time as the contents of the trailer body are to be emptied, or thereafter to afford the operator of the transfer set the same measure of safety as has been a long standing concern relative to the initial opening of the tailgate of the truck.

Thus, the design and construction of vehicles has been wanting with respect to efficiency, safety, and convenience relative to the operation commonly encountered in the use of truck and trailer transfer sets.

BRIEF SUMMARY AND OBJECTS OF THE INVENTION

One object of the present invention is a latching system for a transfer truck and trailer set which is convenient for the operator of the set to utilize.

Relatedly, it is an object of the present invention to eliminate the need for operators of truck and trailer transfer sets to climb to the top of the body of the transfer truck in order to release a trailer body secured temporarily therein.

Nevertheless, it is also an object of the present invention to produce such a latching system which minimizes the time between the release of the trailer body and the assumption of its controlled removal from the truck body.

Another object of the present invention is a latching system as described above which minimizes the opportunities for derailment of a transfer trailer body during the time of its retention in a transfer trailer truck.

Yet another object of the present invention is to eliminate structures such as cooperating horns and apertures which have been utilized to retain a trailer body in a truck body to stabilize the trailer body in the truck body.

Another object of the present invention is a latching system for transfer truck and trailer set which is substantially automatic in implementing its various safety features.

An additional object of the present invention is a latching system for a transfer truck and trailer set which permits an operator of the set to safely release the tailgate of the trailer body when the contents thereof are to be emptied.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein the tailgate of a transfer truck, which must be opened to admit into the truck body a transfer trailer body, is provided with a retention arm fixed relative thereto for movement therewith. As the trailer body is received in the truck body, the truck tailgate is automatically moved under positive pneumatic pressure so as to cause the retention arm to capture a trailer body retention pin attached o the outside of the trailer body. The position of this engagement is located advantageously at a point high and central to the body of the trailer. The release of the trailer body to permit its removal from the truck body is effected by operation of the truck tailgate by the operator at a position from the ground at the rear of the truck body. At that position controls for removing the trailer body from the truck body are normally located, thereby enabling the operator to assume immediate control of the trailer body after it is released from the truck body.

The present invention thus provides a latching system comprising cooperating latching structures, one attached to the trailer body and a second fixed relative to the truck tailgate for movement therewith. Truck tailgate opening means are provided for moving the truck tailgate from its closed position into a trailer body receiving position in which the body of the trailer is receivable into the body of the truck. Therefrom the truck tailgate opening means of the inventive latching system moves the truck tailgate into a trailer body retaining position in which the trailer body is secured in the truck body by the interaction of the cooperating latching structures.

In a preferred form of the cooperating latching structures, that on the truck tailgate takes the form of the retention arm mentioned earlier and that on the trailer body takes the form of a trailer body retention pin. The retention arm is fixed relative to the truck tailgate to avoid interaction with the trailer body retention pin when the truck tailgate is in its trailer body receiving position. Nevertheless, the retention arm captures the trailer body retention pin when the truck tailgate moves into its trailer body retaining position.

The free end of the retention arm terminates in a downwardly oriented retention hook, which itself comprises a notch in the lower side of the retention arm and a linear section between the notch and the free end of the retention arm. The truck tailgate is attached to a tailgate draft arm which is pivotable about a tailgate pivot located above the truck body. The retention arm is secured to the draft arm at a position proximate to tailgate pivot. Moving the truck tailgate out of the trailer body receiving position thereof toward the closed position thereof preferably causes the retention hook to engage the retention pin at a position higher than the tailgate pivot.

According to one aspect of the present invention, the truck tailgate opening means provided therewith comprises a double-acting tailgate cylinder which is activated by a pressurized fluid applied to the head end thereof to move the truck tailgate into the trailer body receiving position. The application of the pressurized fluid to the rod end of the tailgate cylinder urges the truck tailgate out of the trailer body receiving position thereof toward the closed position thereof.

A truck body access mean is pneumatically coupled to the head end of the tailgate cylinder for applying the pressurized fluid thereto. This causes the truck tailgate to be pivoted out of its opened position. Retention hook activation means are also provided for rapidly moving the truck tailgate out of the trailer body receiving position thereof toward the closed position thereof. This is also a pneumatic system, activation of which is preferably effected automatically upon arrival of the trailer body fully into the truck body.

The hook activation means of the inventive latching system comprises a truck tailgate lowering means pneumatically coupled to the head end and the rod end of the tailgate cylinder for dumping pressure in the head end thereof and simultaneously applying pressurized fluid to the rod end. Doing so urges the truck tailgate toward its closed position whereupon the trailer body retention pin is captured by the retention arm. This defines a trailer body retention position of the truck tailgate.

In the inventive latching system, pneumatic control means are provided for terminating activation of the trailer body access means and initiating activity of the truck tailgate lowering means. The pneumatic control means is activated automatically when the trailer body is received into the truck body. In a preferred embodiment, the pneumatic control means comprises a trailer body retaining switch attached to the truck body and an activation finger secured to the trailer body at a position which engages the trailer body retaining switch when the trailer body is received into the truck body. The position of the truck tailgate at this point constitutes the trailer body retaining position thereof. The truck tailgate is selectively releasable from the trailer body retaining position by operation of a manual pneumatic control valve.

According to one aspect of the present invention, safety means are provided for preventing operation of the pneumatic control valve in order to release the truck tailgate from its trailer body retaining position whenever the truck body is tilted from the truck frame. In this manner, any inadvertent dislodgement of the trailer body from the truck body is avoided.

According to another aspect of the present invention, a truck tailgate securement means is provided for retaining the truck tailgate in its closed position. The truck tailgate securement means comprises a truck tailgate securement catch secured to the truck tailgate and a truck tailgate securement hook pivotally mounted on the truck body. The truck tailgate securement hook is pivotable between an engaging position in which it captures the truck tailgate securement catch and a nonengaging position in which it is free therefrom. Truck tailgate securement bias means urges truck tailgate securement hook into its engaging position.

The inventive latching system further comprises a truck tailgate release means for overcoming the truck tailgate securement bias means and for moving the truck tailgate securement hook into its nonengaging position. As one example of such a truck tailgate release means, a spring brake actuator is mounted on the truck body and operably interconnected with the truck tailgate securement hook. Movement of the truck tailgate securement hook into the nonengaging position thereof also serves to release the trailer tailgate when the trailer body is retained in the truck body.

The present invention also contemplates a method for securing the body of the transfer trailer into the body of a transfer truck. In this method, the tailgate of the truck body is moved out of its closed position into a trailer body receiving position using a double-acting tailgate cylinder.

A trailer body retention pin is attached to the trailer body, while a retention arm terminating at the free end thereof in a downwardly oriented retention hook is secured to the pivoted end of the tailgate draft arm by which pivoting of the tailgate is effected. Thereupon the trailer body is transferred by known means into the truck body.

This process automatically activates a truck tailgate opening means for moving the truck tailgate from the closed position thereof into the trailer body receiving position and therefrom into the trailer body retaining position. This latter step involves coupling a source of pressurized fluid to the head end of the tailgate cylinder to raise the tailgate and then dumping the pressure in the head end and supplying pressurized fluid to the rod end of the tailgate cylinder automatically when the tailer body is received into the truck body.

Accordingly, it will be seen that the arrangement of the present invention provides for the use of the truck tailgate to secure the trailer body in the truck body. The tailgate is activated toward this end by the trailer body itself. The operator of the transfer truck and trailer set need not climb to the top of the truck body in order to release the trailer body.

The controls both for releasing the trailer body and for advancing it back to the trailer itself are located at ground level near the rear edge of the truck body. This is convenient and time saving to an operator of the set. In addition, however, safety means are provided for preventing operation of any mechanism to release the truck tailgate when the truck body is tilted from the truck frame.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

Figure 1:
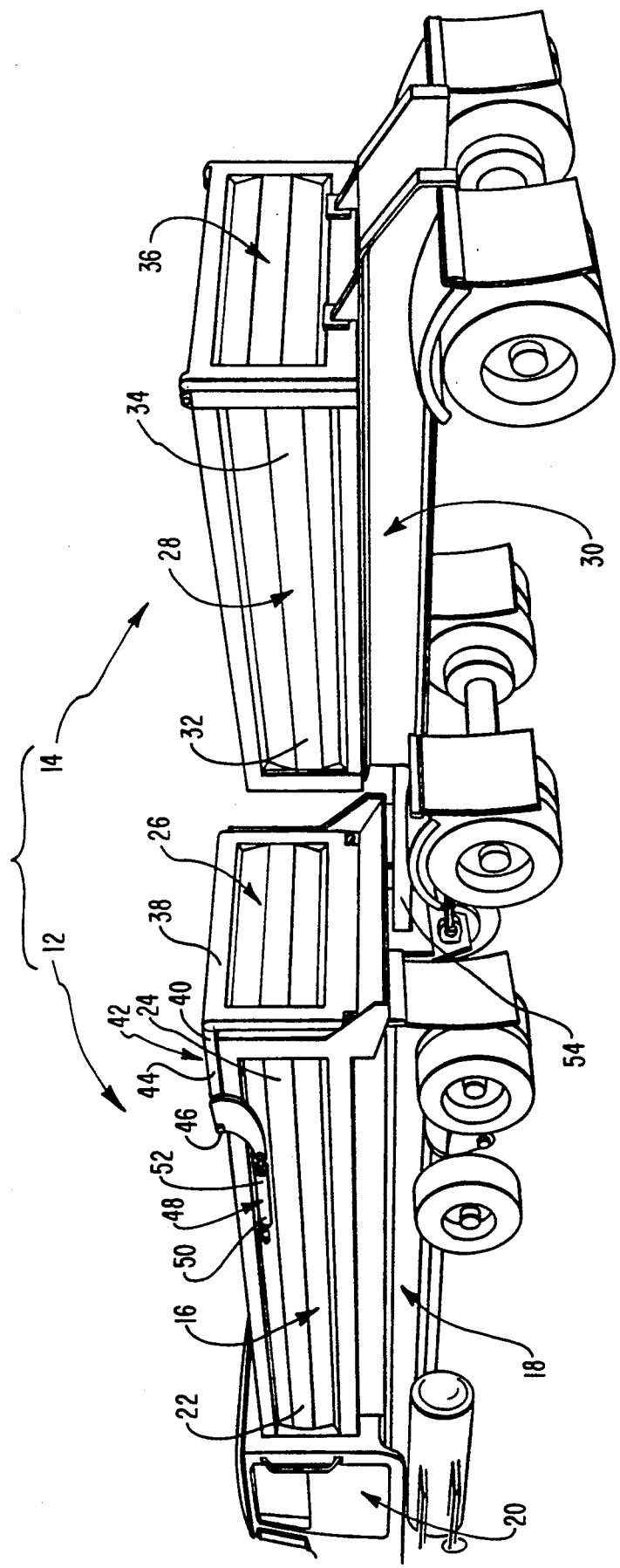
FIG. 1 is a perspective view of a transfer set comprising a transfer trailer being towed behind a transfer truck and incorporating thereinto the inventive latching system.

FIG. 1 illustrates a transfer set 10 comprising a transfer truck 12 and a transfer trailer 14 typical of the transfer vehicles to which a latching system according to the teaching of the present invention finds utility. Transfer truck 12 includes a truck body 16 supported on a truck frame 18 behind a cab 20. Truck body 16 is capable of tilting upwardly at front end 22 thereof in order to empty contents through an opening at the rear end 24 thereof which is normally closed by a truck tailgate 26. Transfer trailer 14 comprises a trailer body 28 carried on a trailer frame 30. Trailer body 28 has a front end 32 and an open rear end 34 normally closed by a trailer tailgate 36. Trailer body 28 is capable of being separated from trailer frame 30 and transferred to truck body 16 by forward movement off of trailer frame 30. When thus entered into truck body 16, it is one object of the inventive latching system to stably secure truck tailgate 26 to truck body 16 for tiling therewith to empty contents from trailer body 28. [Trailer body 28 has a front end 32 and an open rear end 34 normally closed by a trailer tailgate 36.]

As shown in FIG. 1, truck tailgate 26 is in its closed position. Nevertheless, as will be explored in further detail subsequently, truck tailgate 26 is rigidly secured at each side of the top 38 thereof to one end 40 of a tailgate draft arm 42. The other end 44 of tailgate draft arm 42 is pivotable about a tailgate pivot 46 which is fixed relative to truck body 16 at a position above rear end 24 thereof. In this manner truck tailgate 26 is pivotable with tailgate draft arm 42 about tailgate pivot 46, motion in which one embodiment of the present invention disclosed herein is driven by a double-acting tailgate cylinder 48 having a head end 50 and a rod end 52. The pneumatics by which tailgate cylinder 48 is operated and the various positions into which its operation will pivot truck tailgate 26 will be explored in due course.

Reference will first be made to the sequence of schematic illustration appearing in FIGS. 2A-2G.

Figure 2A:
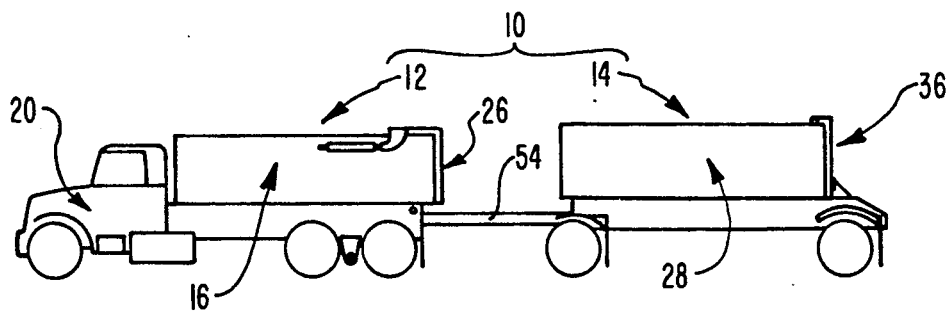
FIGS. 2A-2G are a sequence of schematic illustrations depicting typical steps in the operation of the transfer set illustrated in FIG. 1.
Figure 2B:
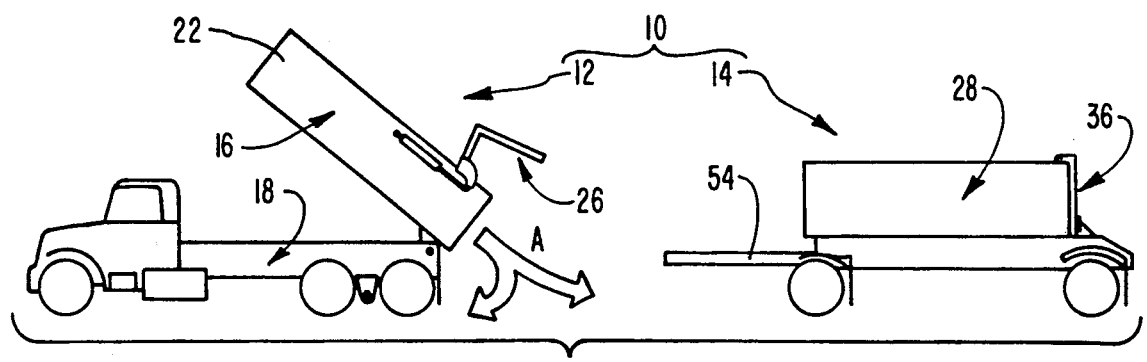

In FIG. 2A transfer set 10 shown in some detail in FIG. 1 is illustrated schematically. There transfer trailer 14 is being drawn by tow bar 54 behind transfer truck 12. In the configuration shown in FIG. 2A, material in both truck body 16 and trailer body 28 can be towed to or will from a construction, excavation, mining, or demolition site by a single operator in cab 20 of transfer truck 12.

In order to empty contents from truck body 16, transfer truck 12 is separated from transfer trailer 14, and truck body 16 is tilted upwardly at front end 22 thereof from truck frame 18. With truck tailgate 2 pivoted out of its closed position, materials in truck body 16 will emerge therefrom as shown by arrow A.

Figure 2C:
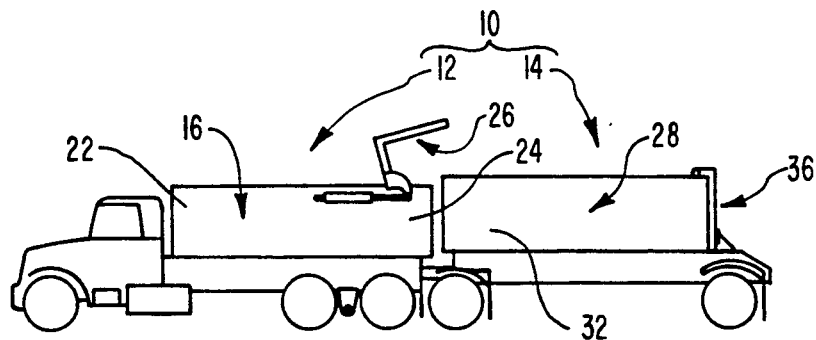

In order to empty contents from trailer body 28, however, more involved procedures are required. First, front end 22 of truck body 16 is lowered onto truck frame 18 with truck tailgate 26 remaining pivoted upwardly from its closed position into a trailer body receiving position as illustrated in FIG. 2C. It should be noted for future comparison that in its trailer body receiving position, truck tailgate 26 has been pivoted from the closed position thereof shown in FIG. 2A to a position slightly above the horizontal.

In the trailer body receiving position of truck tailgate 26, rear end 24 of truck body 16 is capable of receiving trailer body 28. Toward this end transfer truck 12 is backed into aligned proximity with front end 32 of trailer body 28. This relationship among the components of transfer set 10 is shown in FIG. 2C.

Figure 2D:
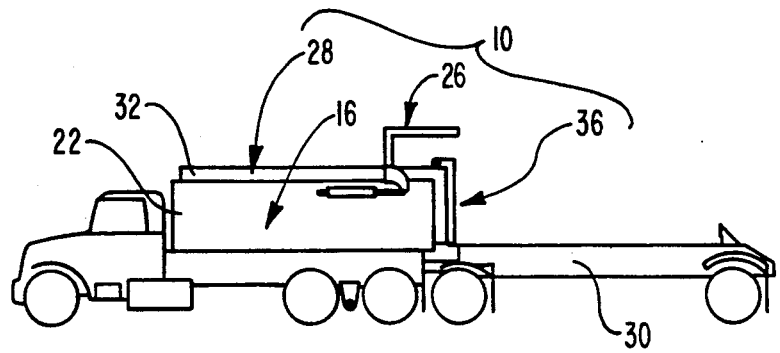

Thereafter, utilizing various advancement means known in the art, trailer body 28 is moved forward on trailer frame 30 into truck body 16, where trailer body 28 is secured in a manner to be explored in greater detail below. A close comparison of that position of truck tailgate 26 in FIG. 2C and FIG. 2D reveals that truck tailgate 26 in FIG. 2D is horizontal. Thus, truck tailgate 26 has been lowered relative to the trailer body receiving position illustrated in FIG. 2C. The position of truck tailgate 26 in FIG. 2D is the trailer body retaining position of truck tailgate 26 in which structures rigidly attached to truck tailgate 26 capture cooperating structures rigidly to trailer body 28.

Figure 2E:
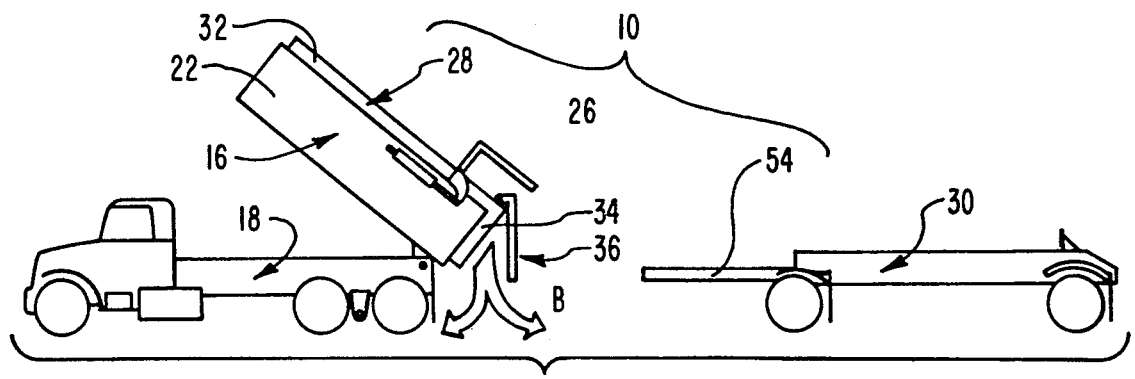

In order to empty contents from trailer body 28, front end 22 of truck body 16 is then pivoted upwardly from truck frame 18. Trailer body 28 is rigidly secured therein and consequently undergoes a corresponding pivoting movement. Trailer tailgate 36 is permitted to open under the influence of gravity during this tilting maneuver, and the contents of trailer body 28 emerge from rear end 34 thereof as illustrated in FIG. 2E by arrows B.

Figure 2F:
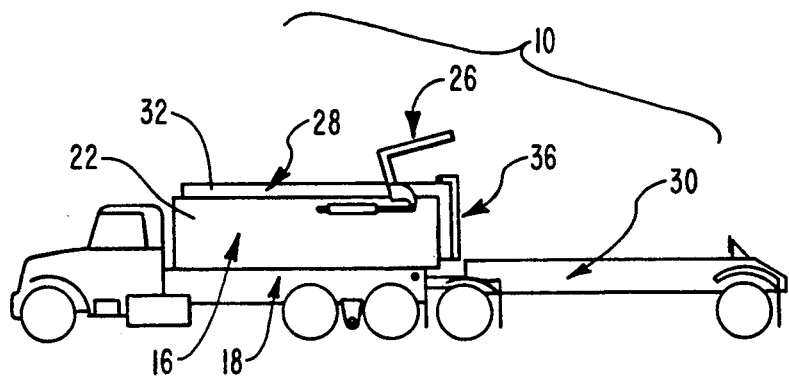

Thereafter, as illustrated in FIG. 2F, truck body 16 is lowered onto truck frame 18. Trailer tailgate 36 closes against rear end 34 of trailer body 28. Transfer truck 12 is again backed into close-aligned proximity with trailer frame 30. Truck tailgate 26 is moved upwardly out of the trailer body retaining position illustrated in FIG. 2E into its trailer body receiving position. In this position, trailer body 28 is no longer secured in truck body 16.

Figure 2G:
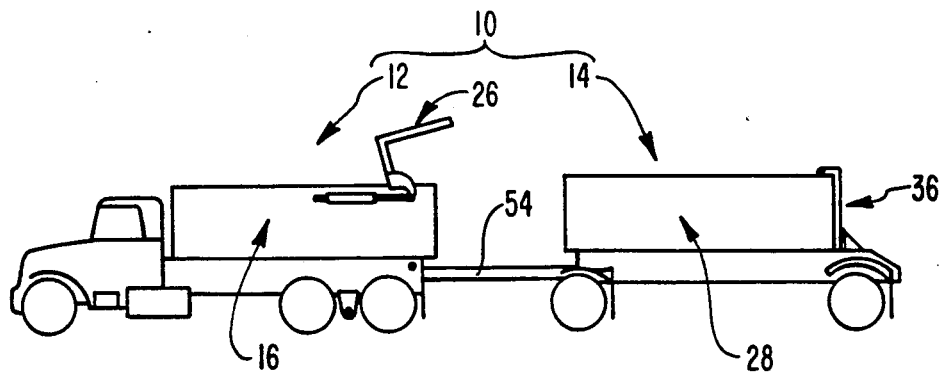

Accordingly, it is then possible to roll trailer body 28 rearwardly out of truck body 16 and onto trailer frame 30. Tow bar 54 is connected between truck body 16 and trailer body 28 as shown in FIG. 2G. Thereafter, truck tailgate 26 will be lowered into the closed position thereof.

Figure 3:
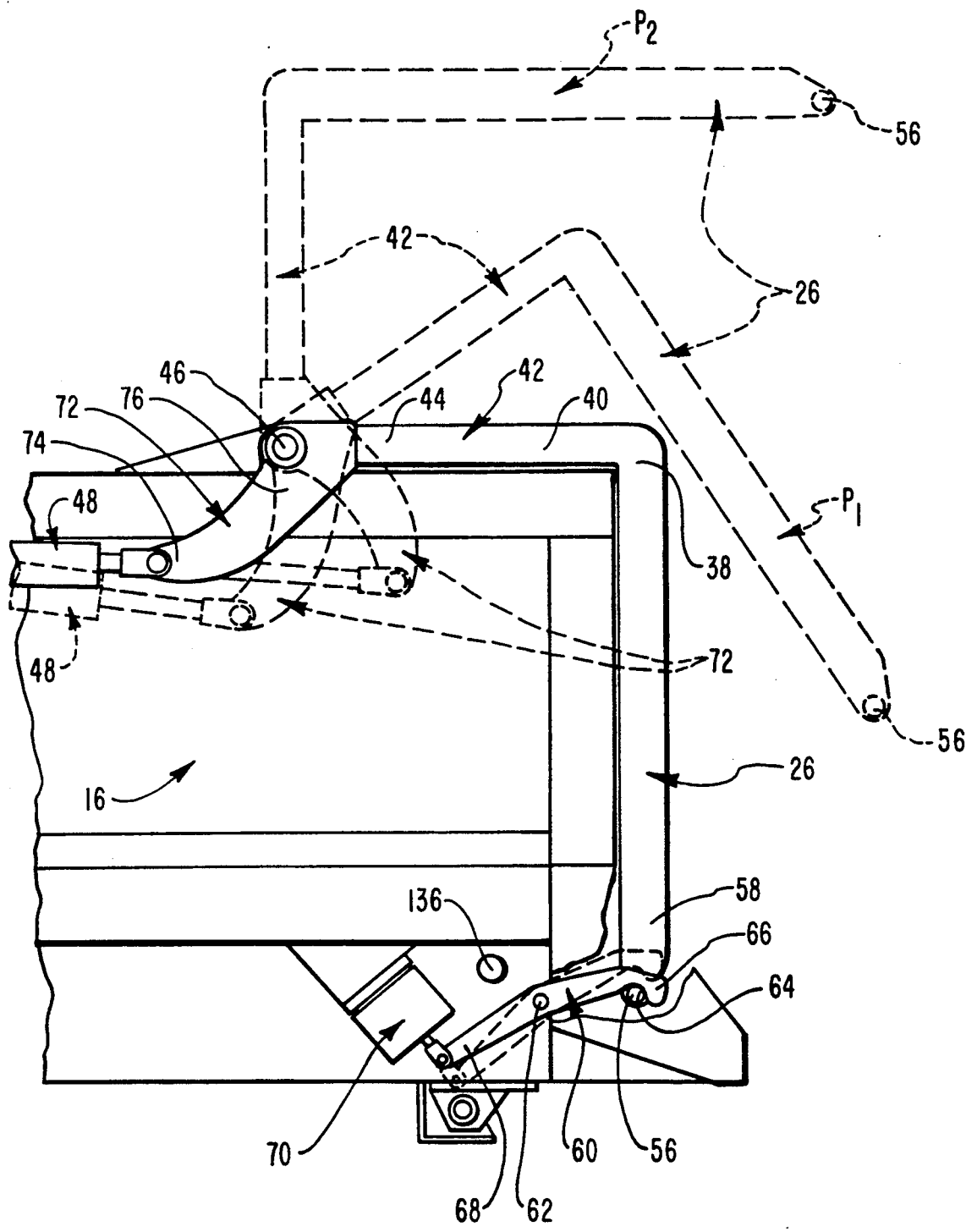
FIG. 3 is a detailed elevational view of a rear sidewall of the body of the transfer truck in FIG. 1 incorporating teachings of the present invention and illustrating components thereof.

FIG. 3 illustrates aspects of truck tailgate 26 exemplifying some teachings of the present invention. According to one aspect thereof, a latching system for a transfer set, such as transfer set 10, is provided with a truck tailgate securement means for retaining truck tailgate 26 in the closed position thereof illustrated in solid lines in FIG. 3. As shown therein by way of example and not limitation, the truck tailgate securement means of the present invention comprises a truck tailgate securement catch 56 attached to the bottom 58 of truck tailgate 26. Correspondingly, a truck tailgate securement hook 60 is pivotally mounted at pin 62 for movement between an engaging position shown in FIG. 3 in solid lines and a nonengaging position shown in FIG. 3 in dashed lines.

In the engaging position of truck tailgate securement hook 60, truck tailgate securement catch 56 is captured in a notch 64 formed in the lower edge of the end 66 of truck tailgate securement hook 60 remote from truck body 16. In this manner, truck tailgate securement catch 56 is precluded from moving away from truck body 16 and consequently truck tailgate 26 is retained in the closed position thereof. The end 68 of truck tailgate securement hook 60 opposite from end 66 is operably interconnected with a spring brake actuator 70 mounted on truck body 16. Within spring brake actuator 70, and not visible in FIG. 3, is a coil spring which pivots truck tailgate securement hook 60 into the engaging position thereof. The coil spring in spring brake actuator 70 is thus one example of a truck tailgate securement bias means for urging truck tailgate securement hook 60 into the engaging position thereof.

According to another aspect of the present invention, however, the truck tailgate securement means of the present invention in turn comprises a truck tailgate release means for overcoming the effect of the coil spring in spring brake actuator 70 and for moving truck tailgate securement hook 60 into the nonengaging position thereof illustrated in dashed lines in FIG. 3. In the nonengaging position of truck tailgate securement hook 60, the truck tailgate securement catch 56 is freed of truck tailgate securement hook 60.

Then the communication of a fluid under pressure to the appropriate portion of tailgate cylinder 4 will pivot truck tailgate 26 and tailgate draft arm 42 rigidly attached thereto about tailgate pivot 46 into the positions $P_1$ and $P_2$ illustrated in dashed lines in FIG. 3.

Figure 4:
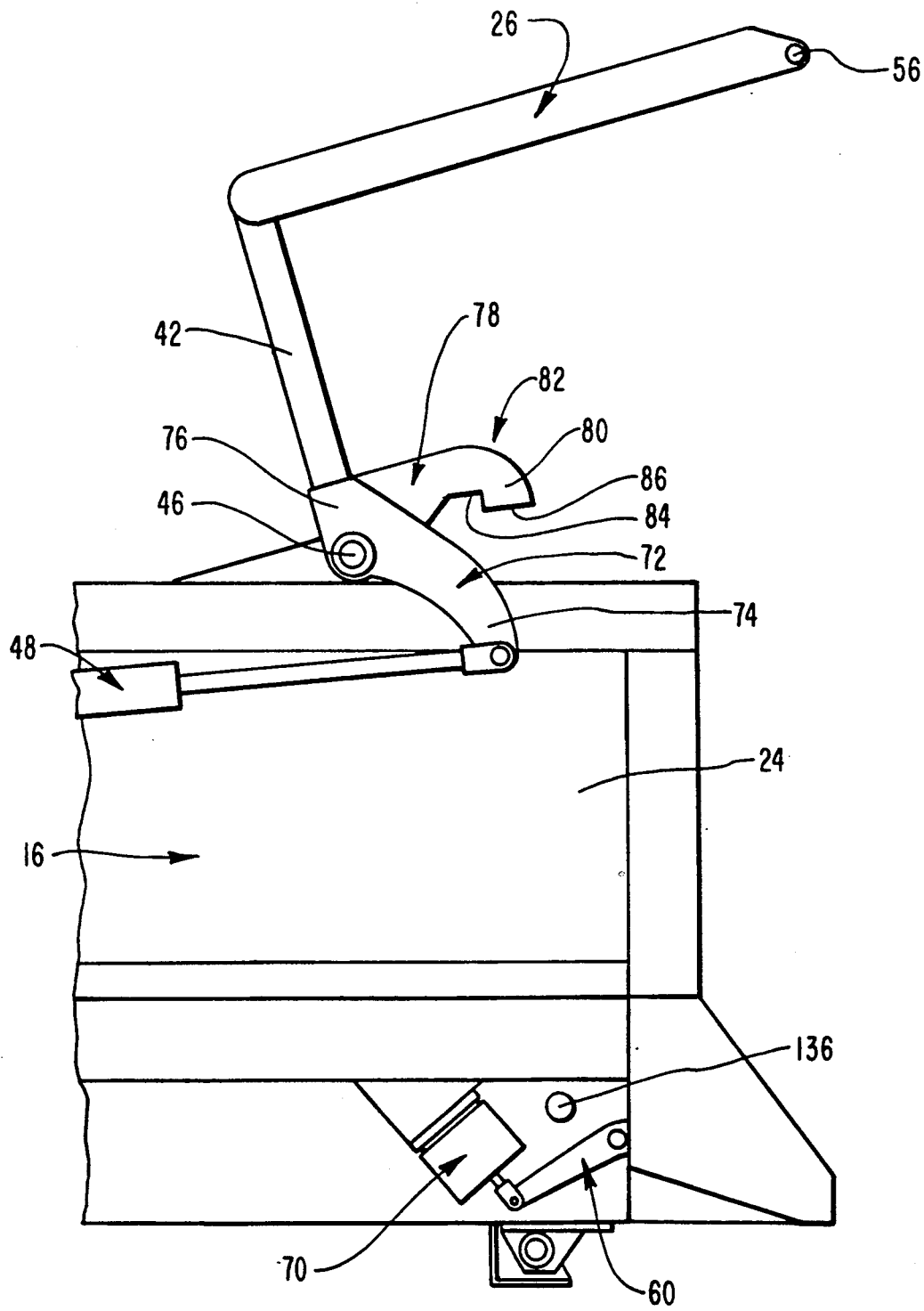
FIG. 4 is an elevational view of the rear side wall of the truck body shown in FIG. 3 showing the tailgate thereof in a position capable of permitting the trailer body to be received into the truck body.

In FIGS. 3 and 4, it will be seen that a tailgate lift arm 72 is operably connected at one end 74 thereof to tailgate cylinder 48 and rigidly connected at the other end 76 thereof to tailgate draft arm 42. FIG. 4, however, illustrates the rear end 24 of truck body 16 with truck tailgate 26 pivoted out of the closed position thereof illustrated in FIG. 3 into the trailer body receiving position thereof. In that position it can be observed that a retention arm 78 is fixed relative to truck tailgate 26 for pivoting movement therewith about tailgate pivot 46. Retention arm 78 is located in the interior of truck body 16 when truck tailgate 26 is in the closed position thereof. Therefore, retention arm 78 can be expected to be able to interact with the structures on the outside of trailer body 28 when trailer body 28 is received into truck body 16.

According to one aspect of the present invention, operating latching means located on trailer body 16 and on truck tailgate 26 are provided for securing trailer body 28 in truck body 16 when truck tailgate 26 is in the trailer body retaining position thereof. As shown by way of illustration in FIG. 1, part of the structure for performing this function comprises retention arm 78, while the other portion of the structure for performing the function of such a latching means is located on trailer body 28 and will be discussed in relation to subsequent figures.

The free end 80 of retention arm 78 remote from tailgate pivot 46 terminates in a downwardly oriented retention hook 82. Retention hook 82 comprises a notch 84 on the lower edge of retention arm 78 and a linear section 86 of retention arm 78 between notch 84 and free end 80. The cooperative interaction of retention hook 82 with structures secured to the outside of trailer body 28 toward the end of retaining trailer body 28 in truck body 16 will be best understood by reference to FIG. 5A.

Figure 5A:
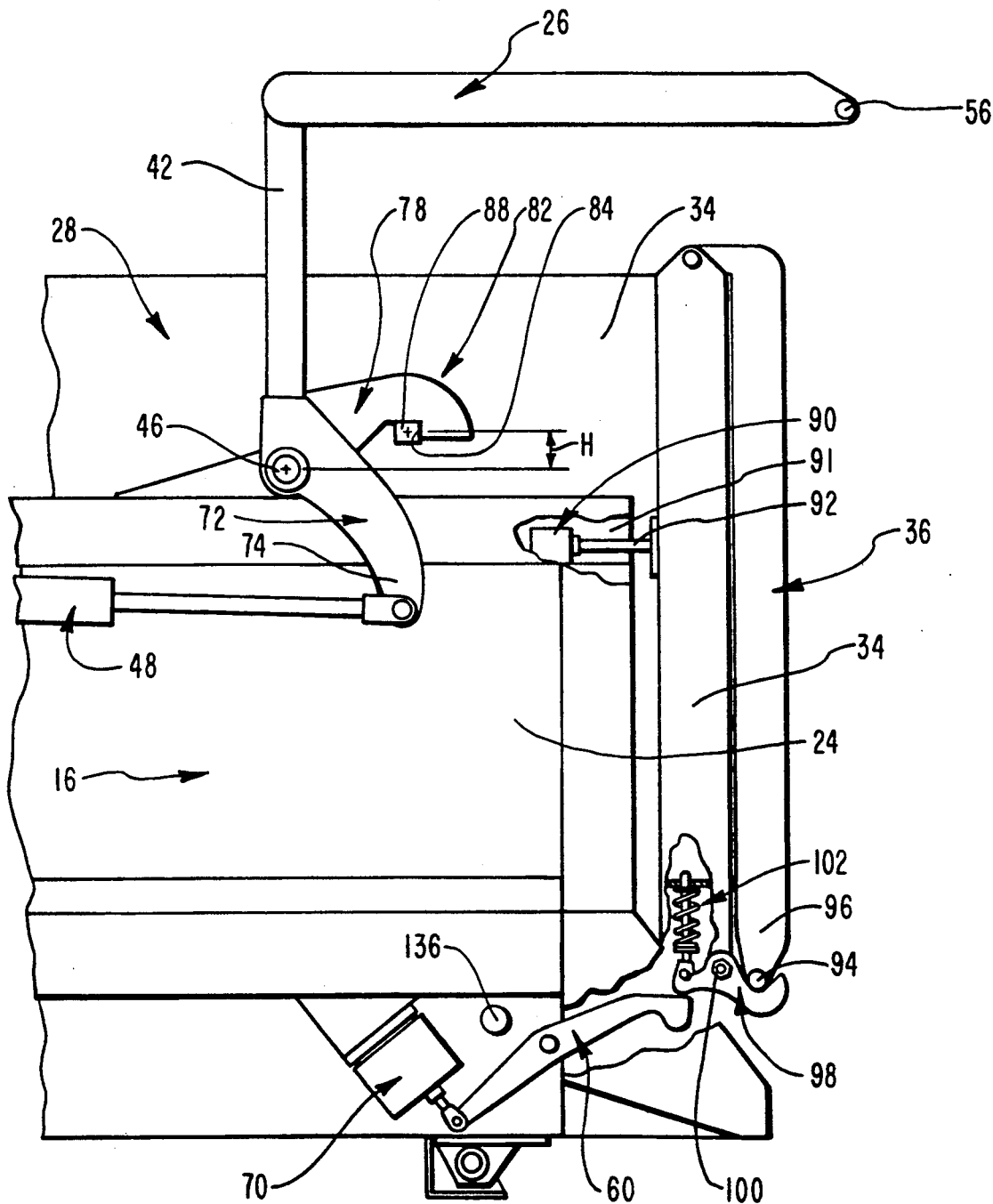
FIG. 5A is a partially broken away elevational view of the truck body illustrated in FIG. 4 with a trailer body received therein.

There, trailer body 28 has been received in truck body 16 and is secured therein through the action of retention hook 82 in capturing a trailer body retention pin 88 attached on the outside of trailer body 28 at a position above and forward of rear end 24 of truck body 16. Trailer body retention pin 88 is shown in FIG. 5A as having a square cross section which mates with notch 84 in the shape thereof illustrated in that figure. The manner in which retention hook 82 is brought downward from the position thereof, which corresponds to the trailer body receiving position of truck tailgate 26, will be explained subsequently.

Prior thereto, advantages inhering in the relative positioning of trailer body retention pin 88 to tailgate pivot 46 will be mentioned. Trailer body retention pin 88 is located above and to the rear of the center of gravity of trailer body 28. Accordingly, when trailer body retention pin 88 is captured by retention hook 82, the weight of trailer body 28 and its contents tends to pivot in a counter-clockwise direction as seen in FIG. 5A about trailer body retention pin 88. This advantageously brings the bottom of trailer body 28 to bear against the floor (not shown) of truck body 16. This is the case, even when truck body 16 is pivoted upward from truck frame 18 with trailer body 28 secured therein, as shown, for example, in FIG. 2E. This contributes to the stability of trailer body 28 in truck body 16 and tends to reduce derailment of its wheels.

In addition trailer body retention pin 88 is higher by an amount H than tailgate pivot 46. Under such circumstances, the tendency of trailer body 28 to slide backward along the floor (not shown) of truck body 16 draws retention hook 82 downward in a counter-clockwise direction as seen in FIG. 5A about tailgate pivot 46. As will be seen subsequently, this direction of pivoting about tailgate pivot 46 is the direction in which pivot of tailgate 26 is urged both by the cantilevered weight of truck tailgate 26 and one end 40 of tailgate draft arm 42 and, by the positive forces of extension exerted on end 74 of tailgate lift arm 72 by tailgate cylinder 48. In addition, the attachment of retention arm 78 to the structure which pivots about tailgate pivot 46, but at a point close thereto, produces a situation in which downward clamping forces applied to trailer body retention pin 88 are applied in a direct manner, without intervening structural elements that might bend and thereby compromise the capture of trailer body retention pin 88 by retention hook 82.

In another aspect of the structure illustrated in FIG. 5A, a trailer body retaining switch 90 is shown disposed in a rearwardly opening recess 91 in the edge of the rear end 24 of the wall of truck body 16. It is the purpose of trailer body retaining switch 90 to alter certain pneumatic relationships in tailgate cylinder 48 and thereby cause tailgate cylinder 48 to rotate truck tailgate 26 about tailgate pivot 46 downwardly in a clockwise direction.

Among the pneumatic elements of the inventive latching system which will be discussed subsequently, tailgate cylinder 48 when activated by a pressurized fluid applied to the head end thereof moves truck tailgate 2 into the trailer body receiving position thereof shown in FIG. 4. On the other hand, tailgate cylinder 48 when activated by a pressurized fluid applied to the rod end thereof urges truck tailgate 26 out of the trailer body receiving position illustrated in FIG. 4 toward the closed position thereof. In this process, however, retention hook 82 engages trailer body retention pin 88 and tailgate cylinder 48 causes retention hook 82 to bear down pneumatically against trailer body retention pin 88.

Activation of trailer body retaining switch 90 basically alters the supply of pressurized fluid from the head end to the rod end of tailgate cylinder 48. Trailer body retaining switch 90 is activated in that regard by an activation finger 92 secured to trailer body 28 at a position which engages trailer body retaining switch 90 when trailer body 28 is received into truck body 16. Thus, as trailer body 28 completes its entry into truck body 16, activation finger 92 by engaging trailer body retaining switch 90 causes the supply of pressurized fluid to tailgate cylinder 48 to be reversed. Tailgate cylinder 48, rather than lifting truck tailgate 26, reverses itself and pulls truck tailgate 26 and retention hook 82 downward. The pneumatic circuitry by which these functions are formed will be disclosed presently.

The shape of tension hook 82 has significance relative to the speed with which it is desired that truck tailgate 62 descends from the trailer body receiving position thereof into the trailer body retaining position in which retention hook 82 captures trailer body retention pin 88. Once trailer body retention switch 90 is activated by activation finger 92, it is important that retention arm 78 sweep downward rapidly. If trailer body 28 is permitted to encounter the front end 22 of truck body 16, it is possible that trailer body 28 will bounce backwards therefrom and not be captured by retaining hook 82. Accordingly, in designing the shape of retaining hook 82 and planning the timing aspects of the pneumatic system by which capture of trailer body retaining pin 88 is effected, the lower surface of retention arm 78 has explicitly been left in a horizontal linear section 86. It has been found that for effective capture of trailer body retention pin 88, it is preferable that retention hook 82 encounter trailer body retention pin 88 before trailer body retention pin 88 is actually in notch 84, rather than after trailer body retention pin 88 has reached notch 84. With the lower portion of retention arm 78 on the opposite side of notch 84 from tailgate pivot 46 being disposed in a linear horizontal fashion, an early impact of retention hook 82 against the top of trailer body retention pin 88 will not preclude eventual capture of trailer body retention pin 88. Instead, even after such premature impact, the momentum of trailer body 28 into truck body 16 continues and eventually retention hook 82 on retention arm 78 snaps about trailer body retention pin 88 capturing trailer body 28 in truck body 16.

Nevertheless, according to another aspect of the present invention, the inventive latching system further comprises a trailer tailgate securement means for retaining trailer tailgate 36 in the closed position thereof shown in FIG. 5A. By way of example, a trailer tailgate securement catch 94 is attached at the bottom 96 of trailer tailgate 36. A trailer tailgate securement hook 98 is pivotally mounted at pivot 100 on trailer body 28 for movement between an engaging position shown in FIG. 5A and a nonengaging position shown in FIG. 5B. In its engaging position, trailer tailgate securement hook 98 captures trailer tailgate securement catch 94 and thus prevents trailer tailgate 36 from pivoting away from rear end 34 of trailer body 28. A trailer tailgate securement bias means in the form of a coil spring 102 is secured between trailer body 28 and trailer tailgate securement hook 98, urging trailer tailgate securement hook 98 into the engaged position thereof.

Figure 5B:
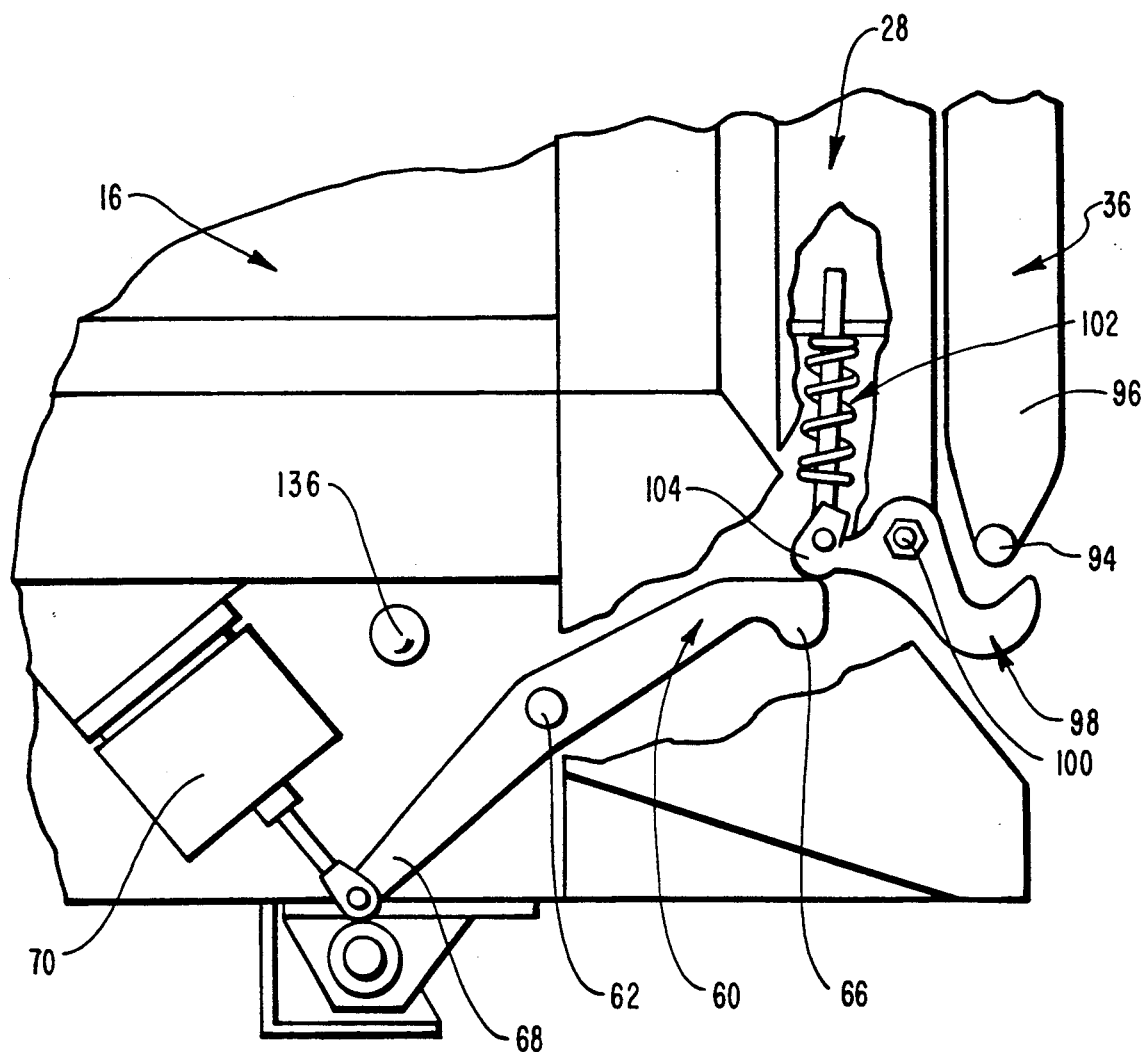
FIG. 5B is a detailed view of the mechanism utilized in FIG. 5A for maintaining closure of the tailgate of the trailer body when the trailer body is received in the truck body.

As shown in another aspect of the present invention, the trailer tailgate securement means of the invention further comprises a trailer tailgate release means for overcoming the trailer tailgate securement bias means and for moving trailer tailgate securement hook 98 into the nonengaging position thereof illustrated in FIG. 5B. There it can be seen that in the nonengaging position, trailer tailgate securement hook 98 is free from trailer tailgate securement catch 94.

In the inventive latching system, a trailer tailgate release means is provided for overcoming coil spring 102 and moving trailer tailgate securement hook 98 into the nonengaging position thereof. As shown in FIG. 5B, by way of illustration and not limitation, such a trailer tailgate release means comprises a spring brake actuator 70 mounted on truck body 16. Spring brake actuator 70 is operably interconnectable with trailer tailgate securement hook 98 whenever trailer body 28 is received in truck body 16. The operable interconnection takes the form of truck tailgate securement hook 60 discussed previously in relation to FIG. 3. Truck tailgate securement hook 60 is so sized and configured that in the nonengaging position thereof, end 66 is urged upwardly against the end 104 of trailer tailgate securement 98 opposite pivot 100 from trailer tailgate securement catch 94. In this manner, truck tailgate securement hook 60 overcomes the bias of coil spring 102 and urges trailer tailgate securement hook 98 into the nonengaging position thereof.

Figure 6:
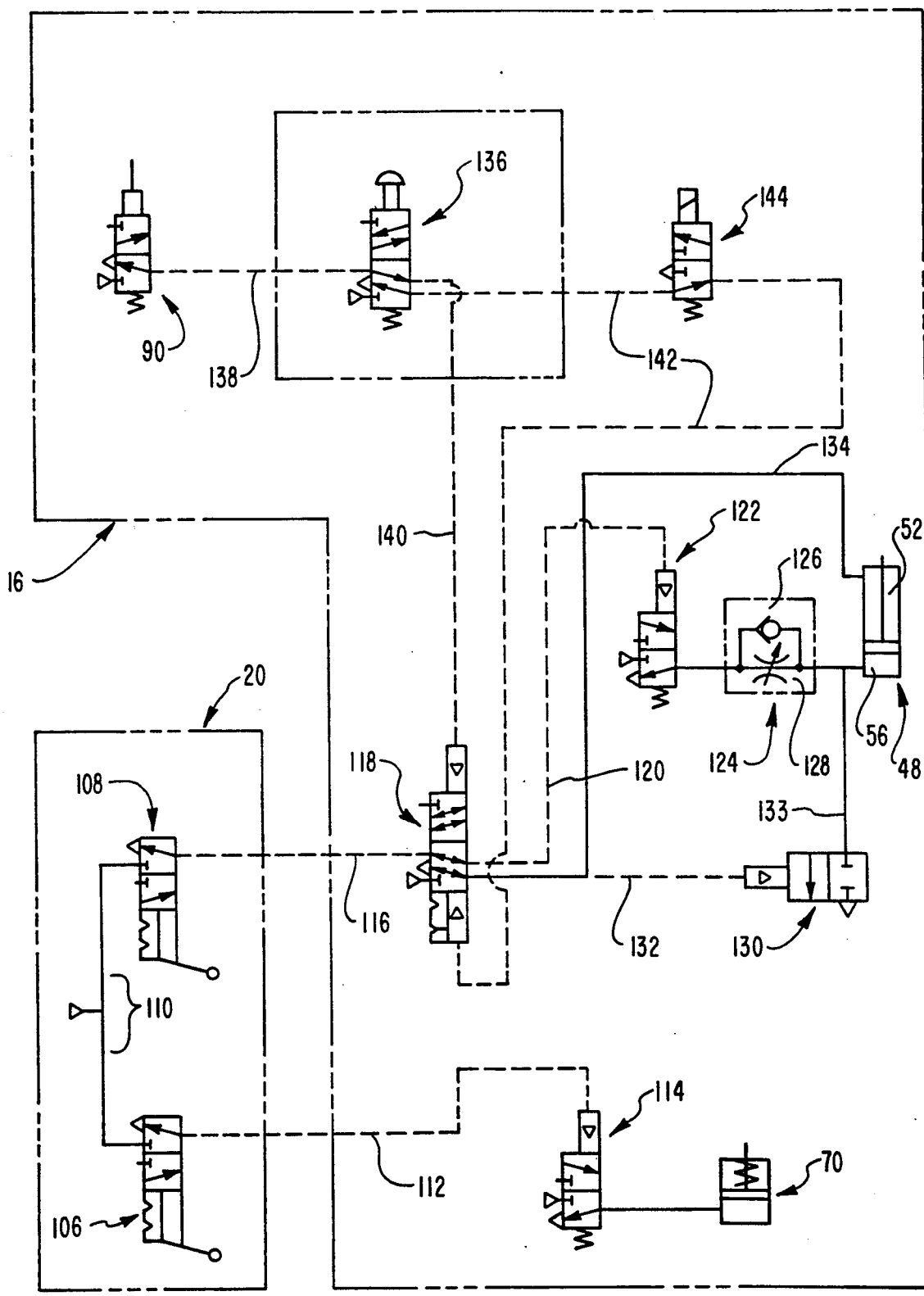
FIG. 6 is a no-load circuit diagram of a pneumatic system incorporating the teachings of the present invention.

The pneumatic system by which truck tailgate 26 is raised and lowered, and in the process trailer body 28 is secured in truck body 16 is illustrated in the no-load condition thereof in FIG. 6. There, a first detent switch 106 and a second detent switch 108 are located in the cab 20 of transfer truck 12 and interconnected with other pneumatic elements as shown.

For example, both first and second detent switches 106, 108 are connected by air pressure line 110 to a source of air pressure. By way of control line 112, first detent switch 106 operates first directional control valve 114 to activate spring brake actuator 70 and release either truck tailgate 26 or trailer tailgate 36. Similarly, second detent switch 108 is coupled by way of control line 116 through a second directional control valve 118 to pneumatic elements required to raise and lower truck tailgate 26.

These include a control line 120 which regulates a third directional control valve 122 capable of supplying air under pressure through flow control valve 124 to tailgate cylinder 48. Flow control valve 124 includes a check valve 126 in parallel with a restrictor 128. Flow control valve 124 permits air to enter head end 50 of tailgate cylinder 48 through check valve 126 and permits air pressure to be bled from head end 50 through restrictor 128.

A quick-exhaust valve 130 which is operable on a control line 132 can permit air pressure in head end 50 of tailgate cylinder 48 to be dumped rapidly by way of vent line 133 to atmosphere. As tailgate cylinder 48 is double-acting, rod end 52 thereof is connected by air pressure line 134 to control line 132 and ultimately to second directional control valve 118.

Subject to the setting of second detent switch 108, the actual raising and lowering of truck tailgate 26 is effected by trailer body retaining switch 90 and a five-way manual control valve 136 mounted at a convenient location for driver operation near rear end 24 of truck body 16. Trailer body retaining switch 90 is coupled by control line 138 to control valve 136, which is preferably located at the lower rear of truck body 16 as shown in FIG. 3. Control valve 136 is in turn capable of operating second directional control valve 118 utilizing either control line 140 or control line 142. Installed in control line 142 is a solenoid-operated directional control valve 144 which when activated blocks control line 142 whenever truck body 16 is lifted from truck frame 18.

The sequence of schematic drawings in FIG. 7A through 7D will now be explored in order to demonstrate the method by which the pneumatic system illustrated in FIG. 6 enables transfer set 10 to undertake the maneuvers illustrated in FIGS. 2A through 2G.

Figure 7A:
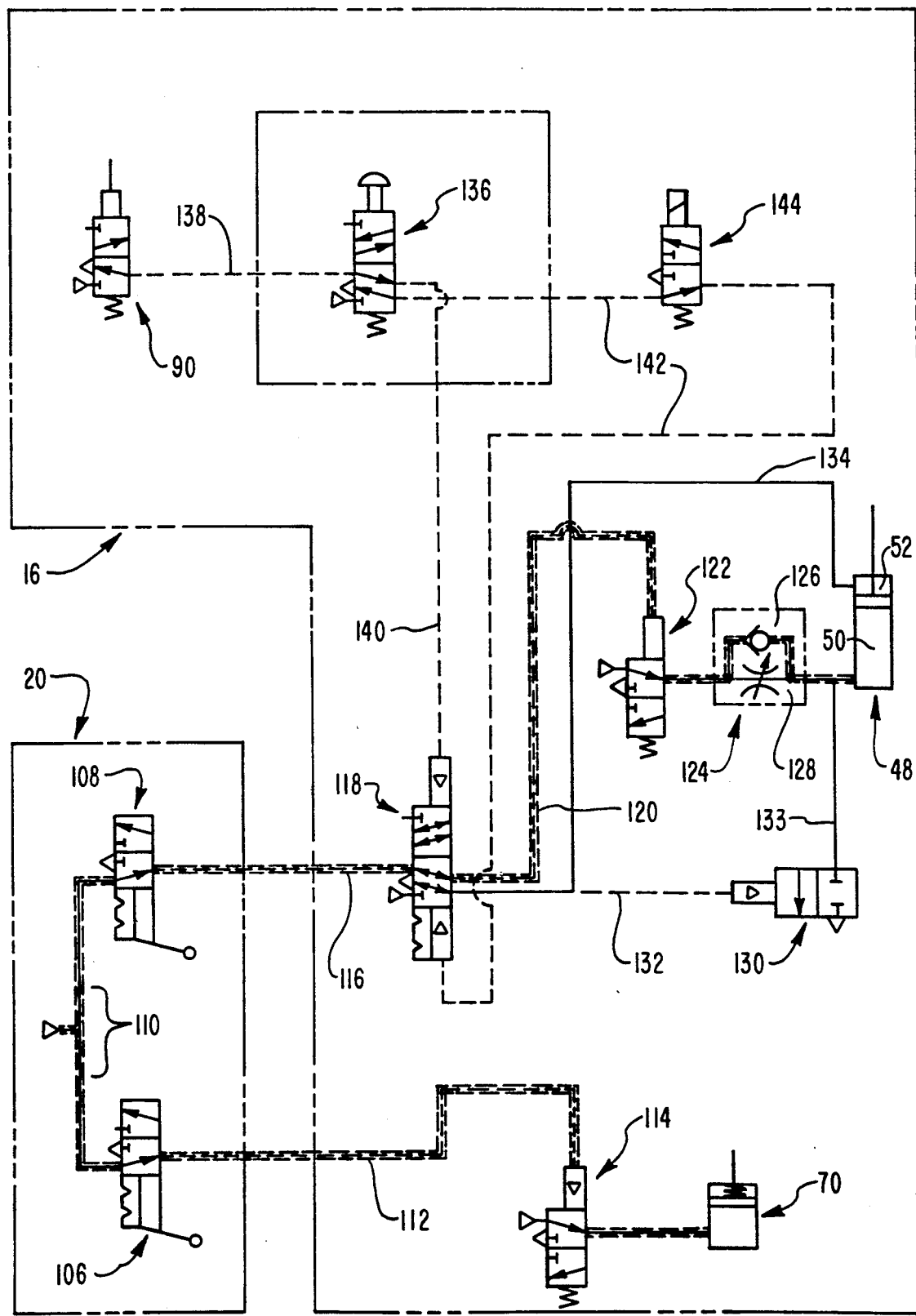
FIGS. 7A-7C are circuit diagrams of the pneumatic systems of FIG. 6 shown in various stages of operation required to effect operation of a transfer truck and trailer set in the manner illustrated in FIGS. 2A-2G.

First, in FIG. 7A first detent switch 106 in cab 20 is activated. This actuates first directional control valve 114, in turn causing spring brake actuator 70 to release truck tailgate 26 by moving truck tailgate securement hook 60 into the nonengaging position thereof shown in dashed lines in FIG. 3. In addition, in FIG. 7A second detent switch 108 in cab 20 is also activated. This results in activating third directional control valve 122, which in turn directs air into head end 50 of tailgate cylinder 48, raising truck tailgate 26 into the trailer body receiving position thereof illustrated in FIG. 2C.

Figure 7B:
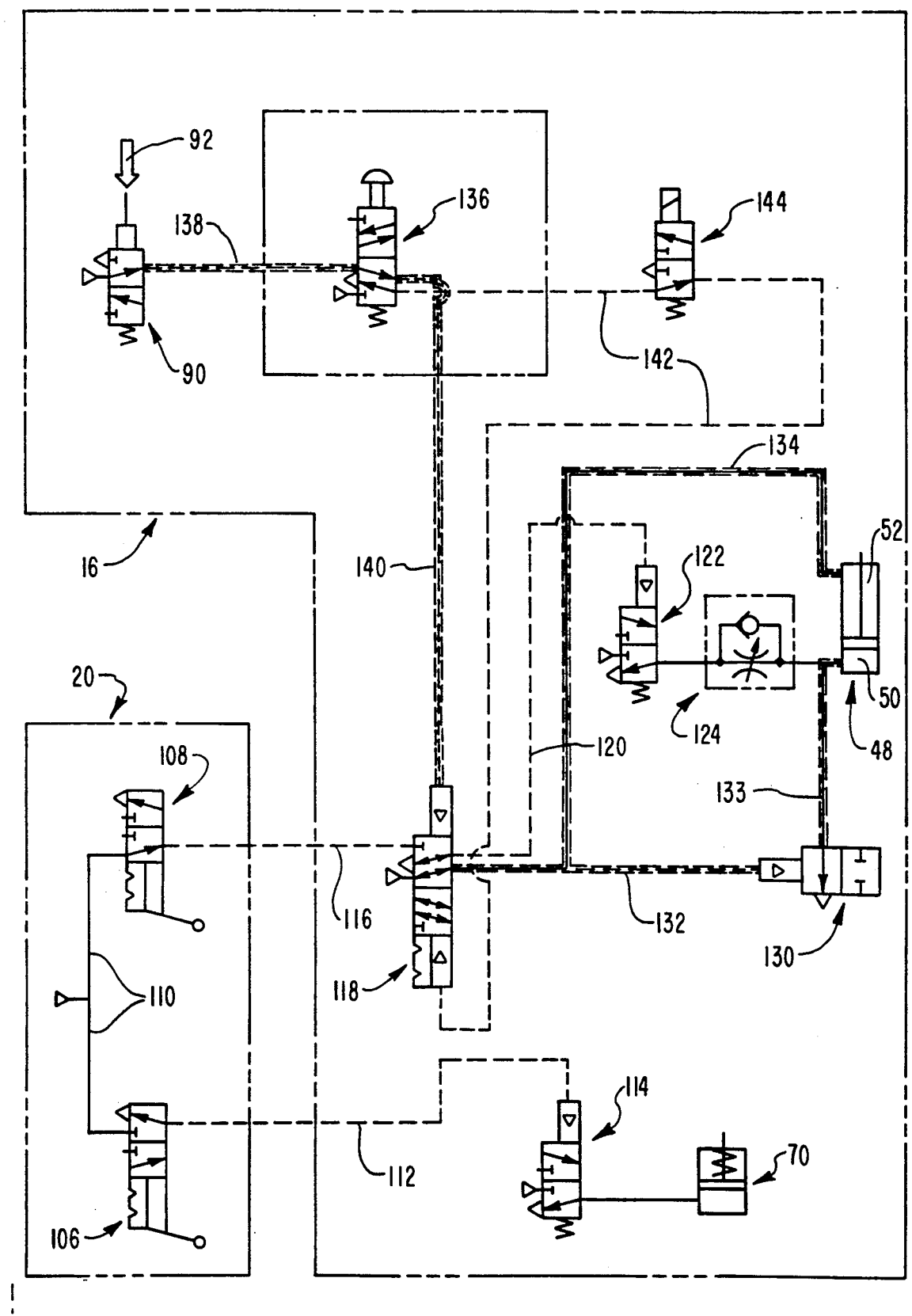

In FIG. 7B, first detent switch 106 in cab 20 has been reversed, deactivating first directional control valve 114 and venting spring brake actuator 70. As a result, truck tailgate securement hook 60 shown in FIG. 3 is returned to its engaging position shown therein in solid lines. Nevertheless, inasmuch as truck tailgate 26 wa in the trailer body receiving position shown in FIG. 2C, the return of truck tailgate securement hook 60 to its engaging position does not catch truck tailgate securement catch 56 in notch 64.

Thereafter, trailer body 28 is drawn into truck body 16 in the manner illustrated in FIG. 2D. As that activity proceeds, activator finger 92 on trailer body 28 eventually engages trailer body retainer switch 90 triggering a flow of air along control lines 138 and 140 to reverse the position of second directional control valve 118. This has the effect of engaging quick-exhaust valve 130 to vent head end 150 of tailgate cylinder 48. Simultaneously, pressurized air is supplied over air line 134 to rod end 52 of tailgate cylinder 48. As a result, truck tailgate 26 is lowered rapidly, and retention hook 82 engages trailer body retention pin 88 to secure trailer body 28 in truck body 16.

Figure 7C:
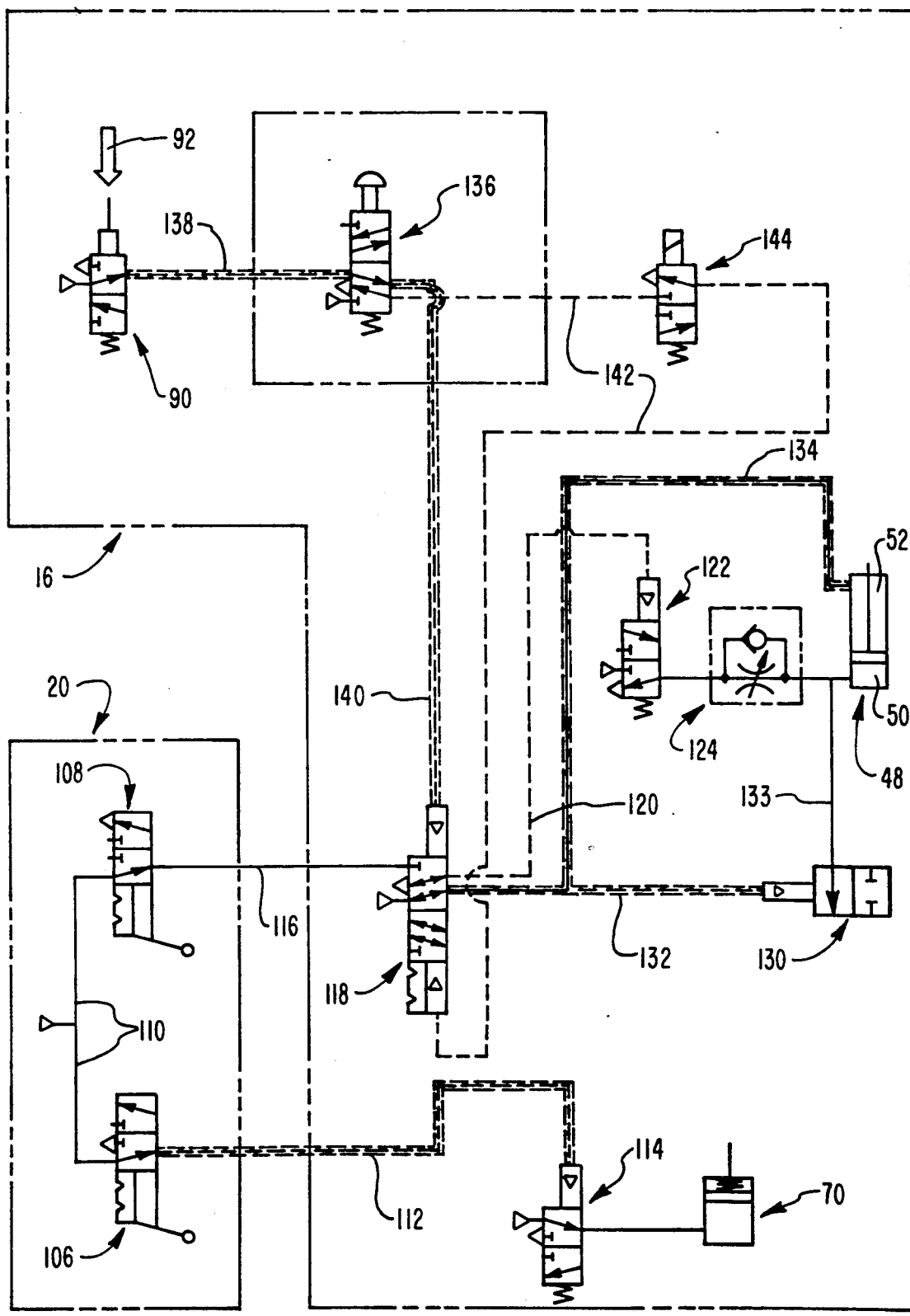

In FIG. 7C, means are illustrated for precluding activation of control valve 136 for the purpose of releasing trailer body 28 through the raising of truck tailgate 26, which disengages retention hook 82 from trailer body retention pin 88. As shown in FIG. 7C by way of example, control valve 144 is installed in control line 142. As control valve 144 is solenoid actuated by the raising of truck body 16 from truck frame 18, control valve 144 assures that when truck body 16 with trailer body 28 disposed therein is tilted from truck frame 18 as shown in FIG. 7E, no operator actions, inadvertent or otherwise, can release trailer body 28 by causing truck tailgate 26 to be raised. In other words, were control valve 136 to be manually actuated, no air would flow through control line 142 for the purpose of reversing second directional control valve 118.

Also in FIG. 7C, first detent switch 106 in cab 20 has again been activated causing first directional control valve 114 to provide air pressure to spring brake actuator 70. This has the effect of moving truck tailgate securement hook 60 into the position thereof illustrated in FIG. 5B which in turn pivots trailer tailgate securement hook 60 against the bias of coil spring 102 to release tailgate 36 of trailer body 28. This permits trailer tailgate 36 to open as shown in FIG. 2E.

In FIG. 7D, truck body 16 has again been lowered onto truck frame 18, thus returning control valve 144 to its original position and permitting manual operation of control valve 36 by the palm P of a hand to be communicated along control line 142 and thus move directional control valve 118 to the alternate position thereof. This results in air passing through control line 116, second directional control valve 118, and control line 120 to activate third directional control valve 122. In turn, air passes through check valve 126 and flow control valve 124 and enters head end 50 in tailgate cylinder 48. Again, this raises truck tailgate 26, freeing trailer body 28 in preparation for its removal from truck body 16. Such a situation is illustrated in FIG. 2F.

Figure 7D:
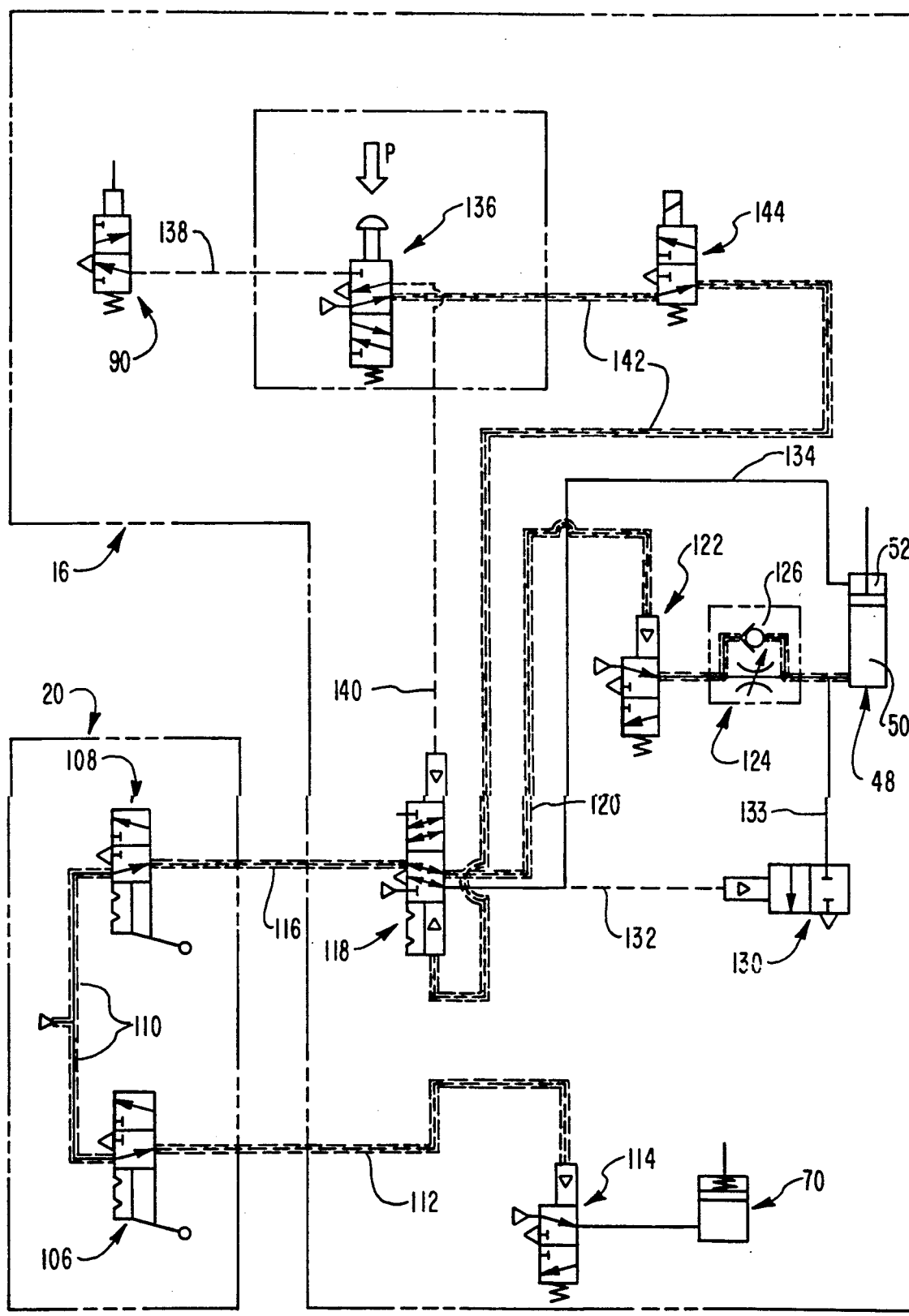

Finally, in relation to FIG. 7D, second detent switch 108 is reversed, cutting off air on control line 116 to second directional control valve 118. In addition, truck tailgate 26 is again locked by deactivating first detent switch 106 in cab 20. This reverses first directional control valve 114 and relaxes spring brake actuator 70. These actions result in the pneumatic system illustrated returning to the no-load condition thereof shown in FIG. 6.

Thus, it can be seen that the latching system of the present invention permits a single operator of a truck and trailer transfer set to safely secure the trailer body in the truck body for subsequent tilting therewith to empty contents from the trailer body. The system disclosed permits the participation of a truck operator without requiring same to climb to the top of the truck body in order to release the trailer body. The latch by which the trailer body is retained in the truck body is effected by a retention arm placed in rigid moving relationship with the truck tailgate. Because of the advantageous position on the trailer body at which the trailer body is retained in the truck body, no rotating of the trailer body is encountered and the cooperating horns and spaces by which additional stability of the trailer body has been effected in the past are not necessary. The disclosed pneumatic system permits the same mechanism which releases the tailgate of the truck to release the tailgate of the trailer when the trailer is received in the truck body. Safety means are provided to prevent inadvertent release of the trailer body during the time that the truck body is pivoted away from the truck frame. The system disclosed, being simpler to operate, can be expected to decrease operational time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A latching system for a transfer truck and trailer set, the transfer truck of the set having a body capable of tilting to empty contents therefrom through a truck tailgate, and the transfer trailer of the set having a body capable of being separated from the trailer, the truck tailgate being openable from a closed position to permit the trailer body to be received into and secured to the truck body for tilting therewith to empty contents from the trailer body through a trailer tailgate having an open and a closed position, the latching system comprising:

(a) a double-acting tailgate cylinder, said tailgate cylinder being activated by a pressurized fluid applied to head end thereof to move the truck tailgate into a trailer body receiving position in which the trailer body is receivable into the truck body, and said tailgate cylinder being activated by said pressurized fluid applied to the rod end thereof to urge the truck tailgate out of said trailer body receiving position thereof toward the closed position thereof and into a trailer body retaining position in which the trailer body is secured in the truck body;

(b) a trailer body retention pin attached to the outside of the trailer body at a position forward of the rear end of the truck when the trailer body is received thereinto;

(c) a retention arm fixed relative to the truck tailgate for movement therewith, said retention arm avoiding interaction with said trailer body retention pin in the trailer body receiving position of the truck tailgate, and said retention arm engaging and locking said trailer body retention pin in said trailer body retaining position of the truck tailgate;

(d) truck body access means pneumatically coupled to said head end of said tailgate cylinder for applying a pressurized fluid thereto; and (e) retention arm activation means for rapidly moving the truck tailgate out of said trailer body receiving position thereof into said trailer body retaining position thereof, said retention arm activation means comprising:

(i) truck tailgate lowering means pneumatically coupled to said head end and said rod end of said tailgate cylinder for reducing pressure in said head end of said tailgate cylinder and for applying said pressurized fluid to said rod end of said tailgate cylinder;

(ii) pneumatic control means for terminating activation of said truck body access means and initiating activity of said truck tailgate lowering means.

2. A latching system as recited in claim 1, wherein the free end of said retention arm terminates in a downwardly oriented retention hook, such hook comprising:

(a) notch in the lower edge of said retention arm; and (b) a linear section of said retention arm between said notch and the free end of said retention arm.

3. A latching system as recited in claim 2, wherein the truck tailgate is rigidly secured at the top thereof to one end of a tailgate draft arm, the truck tailgate being pivotable therewith about a tailgate pivot fixed relative to the truck body and located at the other end of said tailgate draft arm.

4. A latching system as recited in claim 3, wherein said retention pin is secured to the outside of the trailer body at a position above and toward the rear of the truck body from said pivot point when the trailer body is received into the truck body.

5. A latching system as recited in claim 1, wherein said pneumatic control means comprises:

(a) a trailer body retaining switch attached to one of the truck body or the trailer body, said trailer body retaining switch being operable to deactivate said truck body access means and to simultaneously activate said truck tailgate lowering means; and (b) an activation finger secured to the other of said truck body or said trailer body at a position which engages said trailer body retaining switch when the trailer body is received into the truck body.

6. A latching system as recited in claim 5, wherein said trailer body retaining switch is disposed in a rearwardly opening recess in the rear edge of a wall of the truck body.

7. A latching system as recited in claim 6, wherein activation of said pneumatic control means when the trailer body is received in the truck body causes said retaining arm to engage said retaining catch and causes the truck tailgate to assume said retention position thereof.

8. A latching system as recited in claim 7, wherein said truck tailgate is selectively releasable from said trailer body retention position by operation of a manual pneumatic control valve, operation of said pneumatic control valve coupling said pneumatic control valve to a first pneumatic control line.

9. A latching system as recited in claim 8, further comprises safety means for preventing operation of said pneumatic control valve to release the truck tailgate from said trailer body retaining position thereof when the truck body is tilted from the truck frame.

10. A latching system as recited in claim 1, further comprising truck tailgate securement means for retaining the truck tailgate in the closed position thereof.

11. A latching system as recited in claim 1, further comprising trailer tailgate securement means for retaining the trailer tailgate in the closed position thereof.

12. A latching system for a transfer truck and trailer set, the transfer truck of the set having a body capable of tilting to empty contents therefrom through a truck tailgate, and the transfer trailer of the set having a body capable of being separated from the trailer, the truck tailgate being openable from a closed position to permit the trailer body to be received into and secured to the truck body for tilting therewith to empty contents from the trailer body through a trailer tailgate having an open and a closed position, the latching system comprising:

(a) a double-acting tailgate cylinder, said tailgate cylinder being activated by a pressurized fluid applied to head end thereof to move the truck tailgate into a trailer body receiving position in which the trailer body is receivable into the truck body, and said tailgate cylinder being activated by said pressurized fluid applied to the rod end thereof to urge the truck tailgate out of said trailer body receiving position thereof toward the closed position thereof and into a trailer body retaining position in which the trailer body is secured in the truck body;

(b) a tailgate draft arm secured at one end thereof to the top of the truck tailgate, the truck tailgate being thereby rendered pivotable with said tailgate draft arm about a fixed tailgate pivot above the truck body and located at the other end of said tailgate draft arm;

(c) a trailer body retention pin secured to the outside of the trailer body at a position above and toward the rear of the truck body from said tailgate pivot point when the trailer body is received into the truck body;

(d) a retention arm fixed relative to the truck tailgate for movement therewith, said retention arm avoiding interaction with said trailer body retention pin in the trailer body receiving position of the truck tailgate, and said retention arm engaging and locking said trailer body retention pin in said trailer body retaining position of the truck tailgate at a position proximate to said tailgate pivot;

(e) truck tailgate securement means for retaining the truck tailgate in the closed position thereof;

(f) trailer tailgate securement means for retaining the trailer tailgate in the closed position thereof; and (g) truck body access means pneumatically coupled to said head end of said tailgate cylinder for applying a pressurized fluid thereto; and (h) retention arm activation means for rapidly moving the truck tailgate out of said trailer body receiving position thereof into said trailer body retention position thereof, said retention arm activation means comprising:

(i) truck tailgate lowering means pneumatically coupled to said head end and said rod end of said tailgate cylinder for reducing pressure in said head end of said tailgate cylinder and for applying said pressurized fluid to said rod end of said tailgate cylinder; and (ii) pneumatic control means for terminating activation of said truck body access means and initiating activity of said truck tailgate lowering means, said pneumatic control means comprising:

(A) a trailer body retaining switch attached to one of the truck body or the trailer body, said trailer body retaining switch being operable to deactivate said truck body access means and to simultaneously activate said truck tailgate lowering means; and (B) an activation finger secured to the other of said truck body or said trailer body at a position which engages said trailer body retaining switch when the trailer body is received into the truck body.

13. A latching system as recited in claim 12, wherein said truck tailgate securement means comprises:

(a) a truck tailgate securement catch attached to one of either the truck tailgate or the truck body;

(b) a truck tailgate securement hook pivotally mounted on the other of the truck tailgate or the truck body for movement between an engaging position in which said truck tailgate securement hook captures said truck tailgate securement catch and a nonengaging position in which said securement catch is free of said truck tailgate securement hook; and (c) truck tailgate securement bias means for urging said truck tailgate securement hook into said engaging position thereof.

14. A latching system as recited in claim 12, wherein said trailer tailgate securement means comprises:

(a) a trailer tailgate securement catch attached to one of the trailer tailgate or the trailer body;

(b) a trailer tailgate securement hook pivotally mounted on the other of the trailer tailgate or the trailer body for movement between an engaging position in which said trailer tailgate securement hook capture said trailer tailgate securement catch and a nonengaging position in which said trailer tailgate securement catch is free of said trailer tailgate securement hook; and (c) trailer tailgate securement bias means for urging said trailer tailgate securement hook into said engaging position thereof.

15. A latching system as recited in claim 13, wherein said truck tailgate securement means further comprises a truck tailgate release means for overcoming said truck tailgate securement bias means and for moving said truck tailgate securement hook into said nonengaging position thereof.

16. A latching system as recited in claim 15, wherein said truck tailgate release means comprises a spring brake actuator mounted on the truck body, said spring brake actuator being operably interconnected with said truck tailgate securement hook.

* * * * *